(12) United States Patent
Clifford

(10) Patent No.: US 9,183,094 B2
(45) Date of Patent: Nov. 10, 2015

(54) BACKUP IMAGE DUPLICATION

(75) Inventor: Thomas G. Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 556 days.

(21) Appl. No.: 13/480,585

(22) Filed: May 25, 2012

(65) Prior Publication Data

US 2013/0318313 A1    Nov. 28, 2013

(51) Int. Cl.
*G06F 12/16* (2006.01)
*G06F 11/14* (2006.01)
*G06F 11/34* (2006.01)

(52) U.S. Cl.
CPC ........ *G06F 11/1453* (2013.01); *G06F 11/1451* (2013.01); *G06F 11/1461* (2013.01); *G06F 11/349* (2013.01)

(58) Field of Classification Search
CPC ................................. G06F 11/1446–11/1469
USPC .................................................. 711/161–162
See application file for complete search history.

(56) References Cited

U.S. PATENT DOCUMENTS

| | | | |
|---|---|---|---|
| 7,337,198 B1* | 2/2008 | Haslam et al. ........................ 1/1 |
| 7,904,679 B2 | 3/2011 | Stager et al. |
| 8,010,900 B2 | 8/2011 | Hart et al. |
| 8,745,210 B2 | 6/2014 | Sekiguchi |
| 2006/0235907 A1 | 10/2006 | Kathuria et al. |
| 2007/0061513 A1 | 3/2007 | Tsumagari et al. |
| 2007/0299891 A1 | 12/2007 | Jopp et al. |
| 2008/0244601 A1 | 10/2008 | Zeis et al. |
| 2008/0255895 A1 | 10/2008 | Rajamony et al. |
| 2008/0282048 A1* | 11/2008 | Miura ........................... 711/162 |
| 2008/0307527 A1 | 12/2008 | Kaczmarski et al. |
| 2009/0172322 A1 | 7/2009 | Gilpin et al. |
| 2009/0282273 A1 | 11/2009 | Hamilton et al. |
| 2009/0300633 A1 | 12/2009 | Altrichter et al. |
| 2009/0320029 A1* | 12/2009 | Kottomtharayil ............. 718/102 |
| 2010/0250746 A1 | 9/2010 | Murase |
| 2010/0274983 A1 | 10/2010 | Murphy et al. |
| 2010/0293412 A1* | 11/2010 | Sakaguchi et al. .............. 714/17 |
| 2011/0041004 A1 | 2/2011 | Miwa et al. |
| 2011/0093664 A1 | 4/2011 | Leppard |
| 2011/0145496 A1* | 6/2011 | Whaley et al. ................. 711/112 |
| 2011/0161296 A1 | 6/2011 | Kaczmarski et al. |
| 2011/0161297 A1 | 6/2011 | Parab |
| 2011/0184921 A1 | 7/2011 | Reiter et al. |
| 2011/0184966 A1 | 7/2011 | Reiter et al. |
| 2011/0184967 A1 | 7/2011 | Reiter et al. |
| 2011/0185133 A1 | 7/2011 | Reiter et al. |
| 2011/0191777 A1* | 8/2011 | Bansal et al. .................. 718/102 |
| 2011/0258381 A1 | 10/2011 | Rossi et al. |
| 2012/0159175 A1* | 6/2012 | Yocom-Piatt et al. ........ 713/176 |

\* cited by examiner

*Primary Examiner* — Aimee Li
*Assistant Examiner* — Nicholas Simonetti
(74) *Attorney, Agent, or Firm* — Campbell Stephenson LLP

(57) ABSTRACT

Various systems and methods for configuring a duplication operation. For example, a method involves specifying a duplication window, a source storage device, and a target storage device. When a duplication operation is executed, data is copied from the source storage device to the target storage device during the duplication window. The method also involves calculating a predicted duplication rate, where the predicted duplication rate is an estimate of a rate at which data can be copied from the source storage device to the target storage device.

17 Claims, 11 Drawing Sheets

BACKUP IMAGE DUPLICATION

FIELD OF THE INVENTION

This invention relates to data storage and, more particularly, to creating duplicates of backup images.

DESCRIPTION OF THE RELATED ART

In order to prevent data loss, data can be backed up. The process of creating and storing backups of data consumes computing resources, such as transmission bandwidth and storage space. Such computing resources are often limited, so increasing demand for the computing resources by performing backup operations can lead to resource contention among various entities that seek access to the computing resources. In order to minimize the detrimental effects of resource consumption due to backup operations, efforts are made to schedule backup operations such that the backup operations do not take place during times of peak demand for the computing resources. For example, backup operations can be scheduled to take place during nights, on weekends, or during other time periods when resource demand is typically low.

Backup operations produce backup images. A backup image includes a backup copy of the contents of a given storage entity, such as a file system or disk drive. Backup images can be duplicated for any number of reasons. For example, if a backup image is stored on a storage device that is to be replaced, the backup image is duplicated from the storage device to the replacement storage device.

Backup images can also be duplicated for redundancy purposes. A duplication operation is performed to copy a backup image from one storage device to another storage device. As with backup operations, duplication operations consume computing resources. It is desirable to perform duplication operations during times of off-peak resource consumption. One challenge to minimizing performance impacts due to the performance of duplication operations is the difficulty of predicting how long duplication operations will take and scheduling the duplication operations to avoid periods of peak resource use.

BRIEF DESCRIPTION OF THE DRAWINGS

The present invention may be better understood, and its numerous objects, features and advantages made apparent to those skilled in the art by referencing the accompanying drawings.

Figure 1:
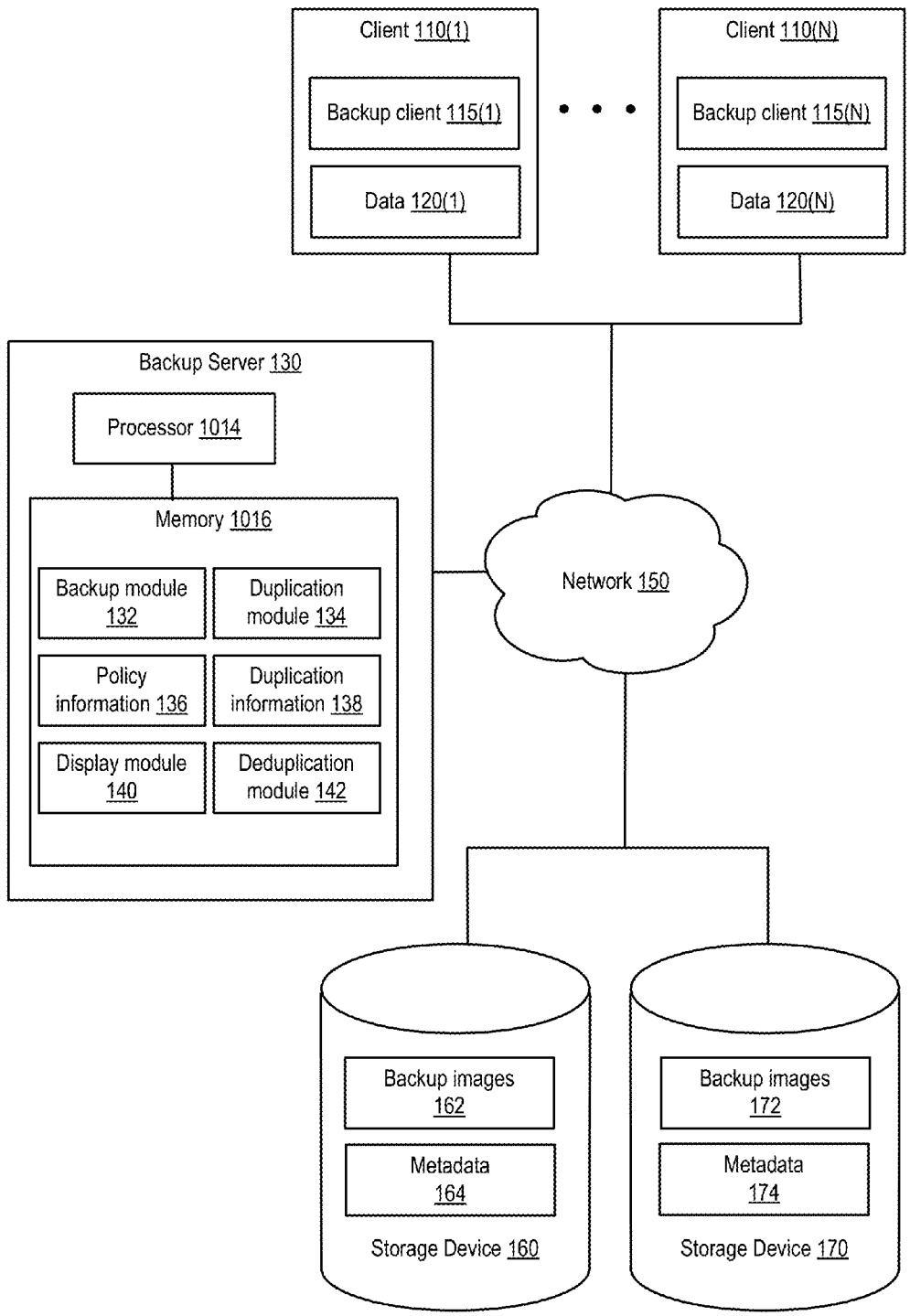
FIG. 1 is a block diagram of a system that can perform backup image duplication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Reducing the detrimental effects on computing resource availability due to backup image duplication operations is one challenge associated with maintaining and operating backup systems. Scheduling duplication operations during off-peak periods of resource consumption is one technique to meet this challenge. However, it can be difficult to know, a priori, how long a duplication operation will take to complete.

Factors that can affect how long a duplication operation takes to complete include, for example, the amount of data being duplicated; the amount of available computing resources, such as transmission bandwidth; the type, speed, and capability of storage devices involved in the duplication operation; utilization of the computing resources by other entities or tasks; and the like. When backup images are stored in deduplicated data storage devices, the difficulty in predicting how long it will take to duplicate the backup images can be compounded since it may be more difficult to determine how much data will actually be copied in a given duplication operation.

In conventional systems that perform duplication operations, a user (e.g., an administrator) selects a number of backup images to duplicate, starts the duplication operation, and hopes for the best. If the user selects too much data (e.g. too many backup images), the duplication operation may not complete within the desired time period, and resource contention can result. For example, if a user schedules a duplication operation to run overnight (when demand for computing resources is typically low) but the duplication operation is still running the next morning (when demand for the computing resources typically increases), resource contention can occur. Contention occurs when the demand for computing resources is larger than the available amount of computing resources. This can lead to duplication operations failing, or terminating unexpectedly. This can also lead to other tasks being unable to successfully complete. Another shortcoming of conventional systems is evident when the user selects too little data and the duplication operation finishes more quickly than anticipated. In this case, valuable resources may go unused, and schedules for completing tasks may not be met. These contingencies can result from the failure of conventional systems to provide effective mechanisms for scheduling and performing duplication operations.

FIG. 1 is a block diagram of a system that can perform backup image duplication operations. The system of FIG. 1 is configured to estimate how long a duplication operation will take and to schedule the duplication operation to complete within a specified time window. As shown, the system includes a number of clients 110(1)-110(N), collectively referred to as clients 110. The system also includes a backup server 130 and storage devices 160 and 170. Clients 110, backup server 130, and storage devices 160 and 170 are coupled by network 150. Network 150 can include a WAN (Wide Area Network), such as the Internet, one or more LANs (Local Area Networks), and/or one or more SANs (Storage Area Networks).

It will be noted that the variable identifier "N" is used to more simply designate the final element of a series of related or similar elements (e.g., backup clients). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Each client 110 is a computing device such as a personal computer, laptop computer, server, personal digital assistant, cell phone, or the like. Each client 110 includes a backup client 115 and data 120. Backup clients 115 are configured to execute backup operations in which a copy of data used by the client, such as data 120, is created and stored in a storage device, such as storage device 160. Backup clients 115 can execute any type of backup operation, including full backups or incremental backups. A full backup involves backup client 115 creating a complete copy of data 120 and storing the complete data copy in storage device 160. An incremental backup involves backup client 115 identifying data that has been changed since a previous backup operation and copying only the changed data to storage device 160. Backup clients 115 can also perform physical or logical backups. In the case of a logical backup, the backup client 115 can perform a backup operation at one ore more of multiple levels, such as at a file level and/or at a volume level.

Data 120 can represent one or more of any logical or physical unit of data, such as a file system, a file, a database, a volume, a block, a disk drive, or the like. One or more applications (not shown) can access data 120. For example, an application such as a word processing program, email program, graphic editing program, database application, server program, or the like can read from or write to data 120.

Backup server 130 is a computing device such as a personal computer, laptop computer, server, personal digital assistant, cell phone, or the like. Backup server 130 includes at least one processor 1014 and a memory 1016. Memory 1016 stores program instructions executable by processor 1014 to implement a backup module 132, a duplication module 134, policy information 136, duplication information 138, a display module 140, and a deduplication module 142.

Backup module 132 can configure and control backup operations, such as backup operations performed by backup clients 115. Backup module 132 can receive input from a user (e.g., an administrator) specifying what type of backup operations are to be performed. This input can be stored in policy information 136. Policy information 136 can include multiple policies. Each policy includes information regarding backup operations for one or more clients 115. For example, a policy can identify one or more clients. For each client, or for all clients identified by the policy, the policy can include a set of rules that dictate how backup operations are performed for the clients, such as the frequency that the client is backed up, a scheduled time to begin a backup operation, the type backup operation to use (e.g., full or incremental), the location of backup storage, a priority associated with the client, a retention scheme that applies to client data, one or more error handling mechanisms applicable to the client, and the like. In addition to identifying which clients are affected by a policy, the policy can identify what data on the clients is affected by the policy. For example, the policy can identify a particular filesystem, volume, disk drive, and the like for one or more of the clients. The policy can also specify data processing rules for the clients, such as encryption and compression rules, and/or application-specific rules. Policy information 136 can be stored in a file, such as a database.

Based on policy information 136, backup module 132 can initiate backup operations for each client 110. The policy information can explicitly identify a type of backup operation. Alternatively, backup module 132 can automatically select a type of backup operation in response to one or more criteria specified by the user. Such a selection can be based on a backup rule included in policy information 136. For example, if user input specifies that a first client 110 is assigned a first priority and a second client 110 is assigned a second priority, backup module 132 can access a backup rule and automatically determine what type of backup operation to perform for the first client 110 and what type of backup operation to perform for the second client 110. Backup module 132 can select, for example, whether the backup operation should be full or incremental, which target storage device is to store the backup image of the client, how often to perform the backup operation, and the like.

Backup module 132 can also gather and store information about backup operations, such as when the last backup operation was performed, what data was backed up, how much data was backed up, how long the backup operation took to complete, where the backup data was stored, and the like. Backup module 132 can store this information in metadata 164.

Each backup operation performed by a backup client 115 produces a backup image. The backup image can be structured as one or more files that include data that was backed up during the backup operation. Backup images are stored in backup data 165 in storage device 160. Storage devices 160 and 170 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Storage devices 160 and 170 can store data in a deduplicated format. Deduplication involves ensuring that each identical data item (e.g., each file or each fixed-size set of data) is only stored once within a deduplicated data storage device. This can be done by calculating a unique (or nearly unique) signature for each data item. Each time a new data item is added to the deduplicated data storage device, the signature of that data item is added to a list. Before a new data item is added, the list is checked to make sure that a copy of the data item has not already been stored in the deduplicated data storage device Deduplication module 142 can perform deduplication of data stored in storage device 160. Deduplication module 142 can detect that a backup client 115 has created a new backup image that is to be stored in storage device 160. Deduplication module 142 can divide the backup image into a number of chunks. A chunk is portion of data having a fixed or variable size. For each chunk, deduplication module 142 calculates a signature, or fingerprint, and compares the fingerprint with a list of fingerprints stored in metadata 164. The fingerprints in the list correspond to chunks of data already stored in storage device 160. If the fingerprint matches a fingerprint in the list, the chunk is already stored and is not stored again. Instead, deduplication module 142 updates metadata 164 to indicate that the new backup image has an interest in the chunk. Deduplication module 142 can include, in the backup image, a pointer to the actual data, rather than store an additional copy of the data itself. In an embodiment, deduplication module 142 can be implemented in storage device 160.

It may become desirable to duplicate data, such as one or more backup images, from storage device 160 to storage device 170. One reason to do so is to provide redundancy so that data in storage device 160 is still available in case of a failure or loss of communication with storage device 160. Alternatively, a user may desire to migrate data off of storage device 160 and onto storage device 170 due, for example, to advances in hardware and/or software represented by storage device 170 that render storage device 160 obsolete. Such end-of-life migrations involve duplicating data stored in storage device 160 and transferring the data to storage device 170. In an embodiment, storage device 170 implements an improved deduplication technology, and a user wishes to switch from storage device 160, which uses a different deduplication technology, or no deduplication technology at all.

Duplication module 134 can configure and control duplication operations. For example, duplication module 134 can duplicate backup images 162 and store the duplicated backup images as backup images 172 in storage device 170. Duplication module 134 can also duplicate metadata 164 and store the duplicated metadata as metadata 174 in storage device 170. In addition to deduplication information, metadata 164 can include information that identifies one or more characteristics of the deduplicated data in backup images 164. For example, metadata 164 can include a catalog of backup images stored in storage device 160, as well as other information such as when the backup images were created, the size of the backup images, ownership information, and the like.

Duplication module 134 can receive input from a user (e.g., an administrator) specifying various parameters regarding a duplication operation. Such information can be stored in duplication information 138 and can include information indicating when a duplication operation is to be performed, a source storage device, a target storage device, which backup images are to be duplicated, which clients are to be duplicated, which policies are to be duplicated, and the like. Duplication information 138 can also include information indicating what data was duplicated during a given duplication operation, when the duplication operation completed, how much data was actually transferred, where the duplicated data is stored, and the like. Duplication information 138 can include information used to configure and control ongoing and future duplication operations as well as information concerning previously run duplication operations.

Duplication module 134 can employ the concept of duplication groups. That is, duplication module 134 can combine multiple backup images for one or more clients into a single group. In an embodiment, duplication operations are performed for the backup images included in a duplication group in a single, atomic duplication operation. A user can add individual backup images to a duplication group, clients to a duplication group and/or the user can add policies to a duplication group. In response to a user adding a client to a duplication group, when a duplication operation is performed for the duplication group, one or more backup images for the client are duplicated, along with backup images of the other clients included in the duplication group. If a user adds a policy to a duplication group, one or more backup images for each client identified by the policy are included in duplication operations performed for the duplication group. For example, adding a policy to a duplication group can result in all backup images for all clients identified by the policy being included in a single duplication operation. Alternatively, only a most recent backup image for each client can be included in the duplication operation.

In an embodiment, duplication module 134 can automatically add a client or policy to a duplication group. Duplication module 134 can add a client or policy to a duplication group in response to evaluating one or more criteria associated with the client or policy. For example, duplication module 134 can detect that a policy identifies a specific storage device as its target storage device. That is, when clients identified by the policy are backed up, the backup images are stored on the given target storage device. In response to detecting that the given storage device is the target storage device for the policy, duplication module 134 can add the policy to a duplication group that includes other policies that identify the same storage device as their target storage device. In this example, duplication module 134 creates a duplication group that includes clients and/or policies that all have the same target storage device. Duplication module 134 can use other criteria as the basis for adding clients or policies to a duplication group. For example, duplication module 134 can organize clients or policies into groups based on such characteristics as the estimated duration of duplicating the clients or policies, the source location of the clients or policies, the owner of the clients or policies, the age of the clients or policies, priority of the clients or policies, and the like. Such organization results in clients and/or policies that have the same characteristics being placed in the same duplication groups.

Duplication module 134 is also configured to estimate a rate at which a given backup image, policy, and/or duplication group can be duplicated from a given source storage device to a given target storage device. Based on the estimated duplication rate and the amount of data that is to be copied, duplication module 134 can calculate how long it will take to duplicate a given backup image or policy. Duplication module 134 can calculate the estimated duration to duplicate a policy based on combining the estimated durations to duplicate each of the clients identified by the policy.

Duplication module 134 is configured to detect a predetermined duplication window duration. The duplication window duration can be received by duplication module 134 as a user specified value and stored in duplication information 138. Alternatively, duplication module 134 can automatically calculate a duplication window duration based on previous duplication window durations and/or based on how long previous duplication operations have taken to complete.

Duplication module 134 can calculate an estimate for a first backup image or policy and compare the estimate with the duplication window duration. If the estimate is less than the duplication window duration, duplication module 134 can select another backup image or policy, generate a new estimate for the new backup image or policy, and add the new estimate to the first estimate to generate a cumulative estimate. Duplication module 134 can then compare the cumulative estimate with the duplication window duration. Duplication module 134 can continue in this manner until the cumulative estimate meets or exceeds the specified duplication window duration. In response to detecting that the estimate meets or exceeds the specified duplication window duration, duplication module 134 can cease the estimating process. Duplication module 134 can also subtract the last added estimate in response to detecting that the cumulative estimate has exceeded the specified duplication window duration. Thus, duplication module 134 estimates the rates for only as many backup images or policies as can be duplicated within the duplication window. This can save considerable computing resources since the estimation process consumes computing resources, and the number of backup images or policies to be duplicated may far exceed the number of backup images or policies that can be duplicated within the specified duplication window duration.

Display module 140 is configured to generate a display that can be used by a user to facilitate scheduling duplication operations. The display can include information that identifies backup images, policies, and/or duplication groups that are available to be duplicated, that are currently being duplicated, or that have already been duplicated. Display module 140 can detect the status of the various backup images and duplication operations and can update a display to reflect the progress of scheduling and performing duplication operations. Display module 140 can also display an estimated time to duplicate one or more backup images and/or policies.

Figure 2:
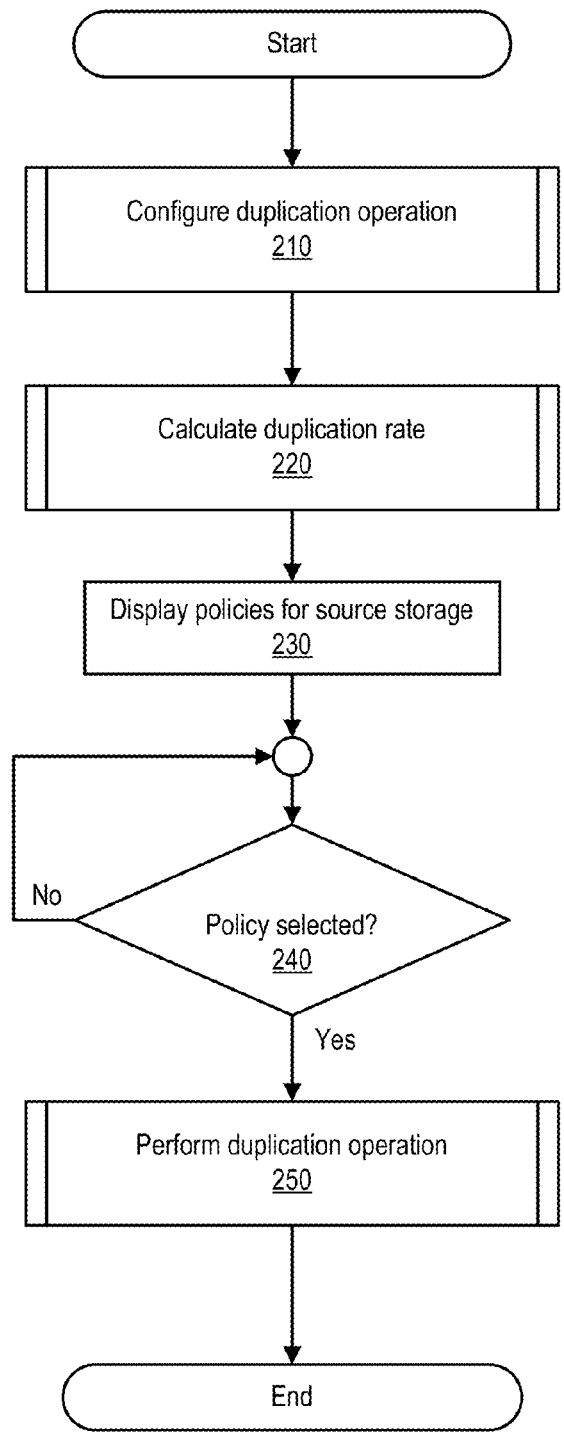
FIG. 2 is a flowchart of a method of duplicating backup images, according to one embodiment of the present invention.

FIG. 2 is a flowchart of a method of duplicating backup images. This method can be performed by a system that includes a backup server, duplication module, and storage devices such as backup server 130, duplication module 134, storage device 160, and storage device 170 of FIG. 1. Generally speaking, the method involves selecting one or more backup images to be included in a duplication operation, scheduling the duplication operation, and executing the duplication operation.

The method begins at 210, where the duplication module configures a duplication operation. In an embodiment, configuring a duplication operation can involve specifying a set of parameter values that control when and how data, such as backup images and/or policies, is to be duplicated. The configuring can also involve specifying where the data is copied from, e.g., one or more source storage devices, and where the data is copied to, e.g., one or more target storage devices. Additional details of this operation are discussed below with regard to FIG. 3.

At 220, the duplication module can calculate a duplication rate. This operation involves calculating an estimation of how long it will take to duplicate one or more backup images, policies, and/or duplication groups. Additional details of this operation are discussed below with regard to FIG. 4.

At 230, a display module, such as display module 140 of FIG. 1, can generate and display a list of policies that are included in the selected source storage device. For example, if the duplication module receives a selection of a given source storage device at 210, such as storage device 160 of FIG. 1, the duplication module can access information associated with the storage device, such as metadata 164 of FIG. 1, to identify which policies are backed up on the selected storage device. The duplication module can transmit a list of policies that are backed up on the storage device to the display module. In response to detecting which policies are backed up on the storage device, the display module can update a display to present a list of the policies, as well as characteristics of the policies. For example, the display module can update a display to show an estimated time to duplicate the policies, or a duplication status of the policies (e.g., duplicated, in progress, or scheduled).

In an embodiment, the display module displays a subset of the policies stored on a source storage device. For example, when a large number of policies is available, the display module can select an arbitrary number of policies, such as a number of policies that can be reviewed by a user in a reasonable amount of time, and displays only those policies. In an embodiment, a user can change or customize which policies are displayed. For example, the user can specify that the display module should display only those policies that can be duplicated within a specified duration, such as during a duplication window, or some other duration, which can be calculated as a function of the duplication window duration. In an embodiment, a user can command the display module to filter policies based, for example, on policy type. That is, the display module can be configured to display only policies that satisfy a criteria, such as only policies associated with a particular application or client, for example. The user can also command the display module to sort the policies according to one or more criteria, such as application type, priority, and the like, and display a sorted list of policies.

A user, e.g., an administrator, can select one or more of the policies for duplication. At 240, the duplication module can detect whether one or more policies were selected for duplication. Selecting a policy can cause the policy to be included in a duplication operation. Selecting a policy can also cause the display module to update a display to indicate that the policy has been selected. The display module can also update and display an indication of the status of the policy, e.g., whether the policy is scheduled to be duplicated, is currently being duplicated, or has already been duplicated. In an embodiment, if the selected policy is already included in an ongoing duplication operation, the duplication module can prevent the policy from being included in another duplication operation. For example, the display module can make a policy that is already included in another duplication operation unselectable in the display, or can display an error message if the policy is selected.

The duplication module performs the duplication operation on the selected policies at 250. This operation involves copying data, such as backup images 162 of FIG. 1, from a source storage device, such as storage device 160 of FIG. 1, to a target storage device, such as storage device 170 of FIG. 1. Additional details of this operation are discussed below with regard to FIG. 5.

Figure 3:
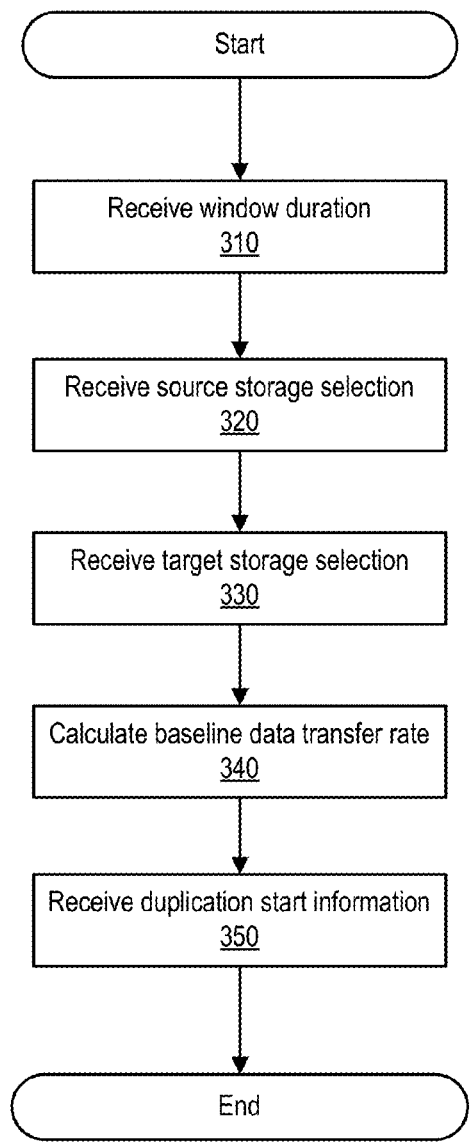
FIG. 3 is a flowchart of a method of configuring a duplication operation, according to one embodiment of the present invention.

FIG. 3 is a flowchart showing additional details of a method of configuring a duplication operation, as in operation 210 of FIG. 2. The method can be performed by a duplication module, such as duplication module 134 of FIG. 1. The method can involve receiving input from a user, such as an administrator. Alternatively, the duplication module can automatically configure a duplication operation. The duplication module can specify one or more parameter values of a duplication operation based, for example, on values used for previous duplication operations. The method begins at 310, where the user specifies a duplication window duration. The duplication window duration is an amount of time which is allocated to allow a duplication operation to complete.

The user can also specify how to handle a duplication operation that does not complete during the specified duplication window duration. For example, the duplication module can detect that the duplication operation will not complete during the duplication window duration. This detection can involve detecting that the duplication window duration has expired. In an embodiment, the duplication module compares an amount of data remaining to complete the duplication operation with the amount of time remaining in the duplication window. In response to detecting that the duplication operation will not complete during the duplication window duration, the duplication module can terminate the duplication operation, allow the duplication operation a pre-specified additional period of time, or allow the duplication operation to complete regardless of additional time, as specified by the user. In an embodiment, the user can specify that the duplication module modify the priority of the duplication operation in response to the duplication operation exceeding the duplication window duration. That is, the duplication operation can continue despite the duplication operation exceeding the duplication window duration, but the duplication operation will be assigned a lower priority to minimize any impact on other processes that utilize the computing system resources used by the duplication operation.

At 320, the user can specify a source storage device selection. The source storage device stores one or more backup images that can be included in a duplication operation. For example, a display module, such as display module 140 of FIG. 1, can generate a list of storage devices that store backup images and present the list of storage devices to a user, e.g., in the form of a drop down menu. The user can select one or more of the storage devices. In an embodiment, the duplication module can automatically detect a source storage device that should be presented. In an embodiment, the duplication module can employ an order and/or priority scheme to automatically select which source storage should be presented so that the data on the storage device can be duplicated. For example, the duplication module can detect that there are a number storage devices that are to be duplicated, and each of storage devices has an assigned priority. The duplication module can only present higher priority storage devices until all the higher priority storage devices have been duplicated. In response to detecting that all the higher priority storage devices have been duplicated, the duplication module can display the storage devices that are assigned the next level of priority, and so on.

The duplication module can select a target storage device in response to receiving user input, at 330, indicating the target storage device. Backup images included in a duplication operation can be duplicated to the target storage device. In an embodiment, the duplication module can automatically select a target storage device based on the source storage device, or based on business rules regarding the available target storage devices. For example, the duplication module can detect hat whether target storage devices are connected to, or are compatible with, a selected source storage device and select a target storage device that satisfies these and/or other criteria.

The duplication module calculates a baseline data transfer rate at 340. This operation can be performed by using a user specified rate, such as a rate specified by a manufacturer or a service provider. For example, a given storage device can be rated as being capable of transmitting data at a certain rate, or a network connection quality of service agreement can guarantee a certain rate of data transmission. The duplication module can use such a specified rate as a baseline data transfer rate.

Alternatively, the duplication module can probe a transmission medium to determine the actual rate of transfer for a sample of data. For example, the duplication module can send a data sample from a source storage device to a target storage device and measure how long the data takes to arrive at the target storage device. The duplication module can calculate a baseline data transfer rate based on the measurements.

Once the duplication module calculates the baseline data transfer rate, the duplication module can estimate how long a given backup image would take to duplicate. For example, if the size of a backup image is 10 Gb, and the baseline data transfer rate is 1 Gb/sec, the duplication module can estimate that the backup image would take 10 seconds to duplicate. The calculated duration is an estimation, rather than an exact prediction, because a number of factors can impact how long a duplication operation takes to complete. For example, while the baseline data transfer rate can be measured, the actual data transfer rate may vary such that the actual data transfer rate is not identical to the baseline data transfer rate for the entire duration of the duplication operation. Another factor that can affect the time taken to perform a duplication operation is whether the backup images are being duplicated to deduplicated storage. For example, while the size of a backup image may be listed as 10 Gb, if the backup image is being copied to a deduplicated storage device, the actual amount of data that is duplicated can vary, depending on the deduplication density of the deduplicated storage device. That is, if the deduplicated storage device is heavily deduplicated, a backup image listed as 10 Gb may include only 5 Gb, for example, of data and references to the remaining 5 Gb of data that is in common with (and is included in) other backup images stored in the storage device.

At 350, the duplication module receives information indicating when to begin a duplication operation. In an embodiment, the duplication module receives user input indicating a time and/or date at which to initiate a duplication operation. Alternatively, user input can specify a frequency with which to initiate duplication operations. For example, a user can specify that a duplication operation should be performed once a month. The duplication module can keep track of the time between duplication operations and automatically initiate a duplication in response to detecting that a specified period has elapsed. In an embodiment, the duplication module can be configured to initiate a duplication operation in response to detecting that a previous duplication operation has completed, or in response to detecting that sufficient bandwidth exists to complete the duplication operation within the window duration.

Figure 4:
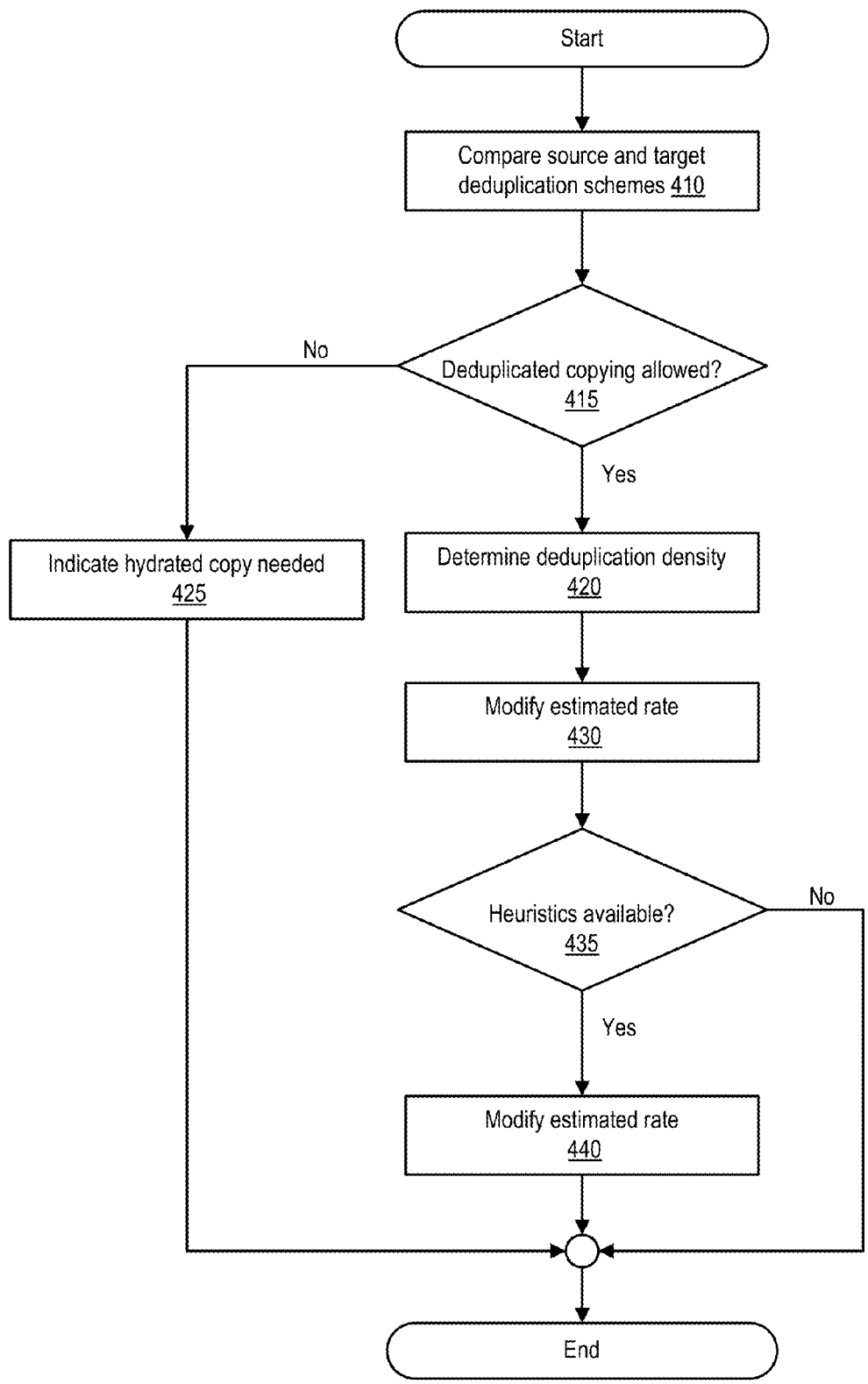
FIG. 4 is a flowchart of a method of estimating a duplication rate, according to one embodiment of the present invention.

FIG. 4 is a flowchart of a method of calculating a duplication rate, as in operation 220 of FIG. 2. The method begins at 410, where a duplication module, such as duplication module 134 of FIG. 1, detects a deduplication scheme (if any) of a source storage device, such as storage device 160 of FIG. 1, and a deduplication scheme (if any) of a target storage device, such as storage device 170 of FIG. 1, and compares the deduplication schemes. The extent to which these deduplication schemes are identical, or compatible, can affect how quickly data can be duplicated from the source storage device to the target storage device. Aspects of a deduplication scheme that the duplication module can compare include characteristics such as method of segmenting data into chunks and method of calculating signatures for data segments. Segmentation methods can vary based on, for example, segment size and the location in a backup image, or other unit of data, a first segment and subsequent segments begin. If a first deduplication scheme uses one segment size, and a second deduplication scheme uses a different segment size, or one uses fixed size chunks and another uses variable sized chunks, identical data will result in different segments, so the deduplication schemes are incompatible. Signature generation, or fingerprinting, includes what type of signature is generated for a given data segment. Various algorithms can be used to generate a signature for a segment of data. For example, hashing algorithms such as Message-Digest Algorithm 5 (MD5), Secure Hash Algorithm 1 (SHA-1), and Secure Hash Algorithm 256 (SHA-256) and the like can be used to generate signatures. If a first deduplication scheme uses one algorithm to generate signatures, and a second deduplication scheme uses a different algorithm to generate signatures, identical data will result in different signatures, so the deduplication schemes are incompatible.

The duplication module detects, at 415, whether deduplicated copying is allowed. If not, as in the case of incompatible deduplication schemes between the source storage device and the target storage device, or a source storage device or target storage device that is not deduplicated, the duplication module indicates, at 425, that hydrated copying will be used. This indication can involve setting a flag or storing a value in duplication information, such as duplication information 138 of FIG. 1. Hydrated copying means that data is copied in non-deduplicated form. This can involve rehydrating data that has been deduplicated, or copying data that is not deduplicated. For example, if a backup image is deduplicated, while the listed size of the backup image may be 10 Gb, the actual amount of data stored for the backup image may be only 8 Gb, due to removal of duplicate chunks. Thus, duplicating the backup image in deduplicated form involves copying 8 Gb of data. However, if the data is to be rehydrated, the chunks that were previously not stored are restored and the entire 10 Gb of the backup image is copied.

If hydrated copying is not to be used, the duplication module detects, at 420, the deduplication density of source data. The duplication module can detect a deduplication density and estimate how long it will take to duplicate a backup image based on the deduplication density. For example, the duplication module can access backup information, such as metadata 164 of FIG. 1, to detect the listed size and the actual size of a backup image. Based on these measurements, the duplication module can calculate a deduplication density for the backup image. For example, if the listed size of a backup image is 10 Gb, and the actual size is 8 Gb, the deduplication density can be calculated as 20%. That is, deduplicating the backup image reduces the amount of storage used to store the backup image by 2 Gb, or 20%.

The duplication module can modify the estimated rate for duplicating a backup image based on the deduplication density of the backup image. An increase in deduplication density generally corresponds to an increase in duplication rate, or to using less time to duplicate a backup image. In an embodiment, the baseline duration is calculated using a deduplication density of zero. That is, the baseline duration can be calculated as though the data is not deduplicated, or as though all 10 Gb of a 10 Gb backup image will be copied. The deduplication density can rise with successive duplication operations, since the probability of an identical chunk having been previously duplicated tends to rise as more data is duplicated. If the duplication module calculates a deduplication density that is higher than previous deduplication densities, the duplication module can calculate a new estimated duplication rate based on the new deduplication density or the difference between the new deduplication density and a previously calculated deduplication density.

At 435, the duplication module can detect whether heuristics about prior duplication operations are available. The duplication module can detect how long a given backup image previously took to duplicate. Based on the previous length, the duplication module can predict how long a subsequent duplication operation is likely to take. For example, if a previous duplication operation completed in significantly less time than is estimated, the duplication module can factor that information into an estimation of how long a subsequent duplication operation will take. In an embodiment, the duplication module can record duplication times for multiple previous duplication operations and calculate an estimated rate based on how quickly the duplication rate changed for the previous duplication operations. In another embodiment, the duplication module calculates a weighted average of previous duplication operations of a given image or policy. The duplication module can assign greater weight to more recent duplication operations as more recent operations are likely to more closely predict how long a duplication operation will take. Based on the heuristic information, the duplication module can modify, at 440, the estimated rate.

Figure 5:
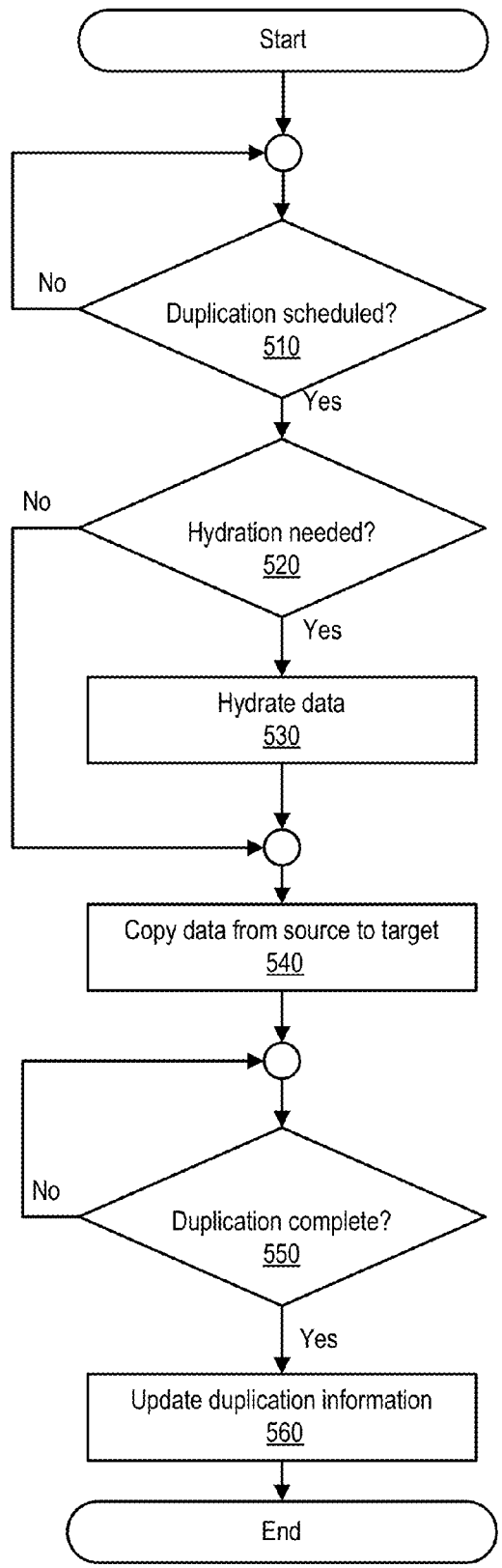
FIG. 5 is a flowchart of a method of duplicating backup images, according to one embodiment of the present invention.

FIG. 5 is a flowchart showing additional details of a method of duplicating backup images, as in operation 250 of FIG. 2. At 510, a duplication module, such as duplication module 134 of FIG. 1, detects whether a duplication operation is scheduled. This can involve detecting the expiration of a specified time period, receiving user input, or detecting the occurrence of a threshold criteria, such as a source storage device becoming overloaded, or a target storage device becoming available. In addition, the duplication module can automatically initiate a duplication operation in response to a failure or other contingency.

In response to detecting that a duplication operation is scheduled, the duplication module detects, at 520, whether backup images that are scheduled to be duplicated should be rehydrated. The duplication module can detect whether a value in duplication information, such as duplication information 138 of FIG. 1, indicates that the backup image should be rehydrated. If the duplication module detects that a backup image is to be rehydrated, the duplication module rehydrates the data at 530. Rehydrating the backup image involves the duplication module placing the backup image in the state the backup image would exist without having been deduplicated.

At 540 the duplication module initiates copying the backup images from the source storage device to the target storage device. To perform this operation, duplication module reads a chunk from the source storage device, transmits the chunk to the target storage device, and writes the chunk to the storage device. In the case of deduplicated data, the duplication module can detect that a chunk of a backup image already exists in the target storage device, e.g., by comparing a signature for the chunk with a list of chunks stored in the target storage device. If a given chunk already exists in the target storage device, the duplication module can copy a reference link, or pointer, to the existing chunk rather than actually copying the chunk again. The deduplication density can be said to increase since the target storage device now purports to store the additional chunk of data, though the additional chunk of data was not actually added to the actual amount of data stored in the target storage device was not increased.

At 550, the duplication module detects whether the duplication operation is complete. This can include detecting that all selected data has been copied or detecting that the time allotted for the duplication operation has been reached.

In response to detecting that the duplication operation is complete, whether by virtue of detecting that all selected data has been copied or due to the expiration of a duplication window, the duplication module updates duplication information, such as in metadata 174 of FIG. 1, at 560. This operation can include indicating whether the duplication operation completed successfully, when the duplication operation finished, what data was duplicated, and the like. In the case where a portion of a backup image is duplicated, e.g., when the duplication operation is halted while the backup image is being duplicated, the duplication module can record the point at which the duplication operation was halted. This allows subsequent duplication operations to resume duplication at the point at which the previous duplication operation left off.

Figure 6:
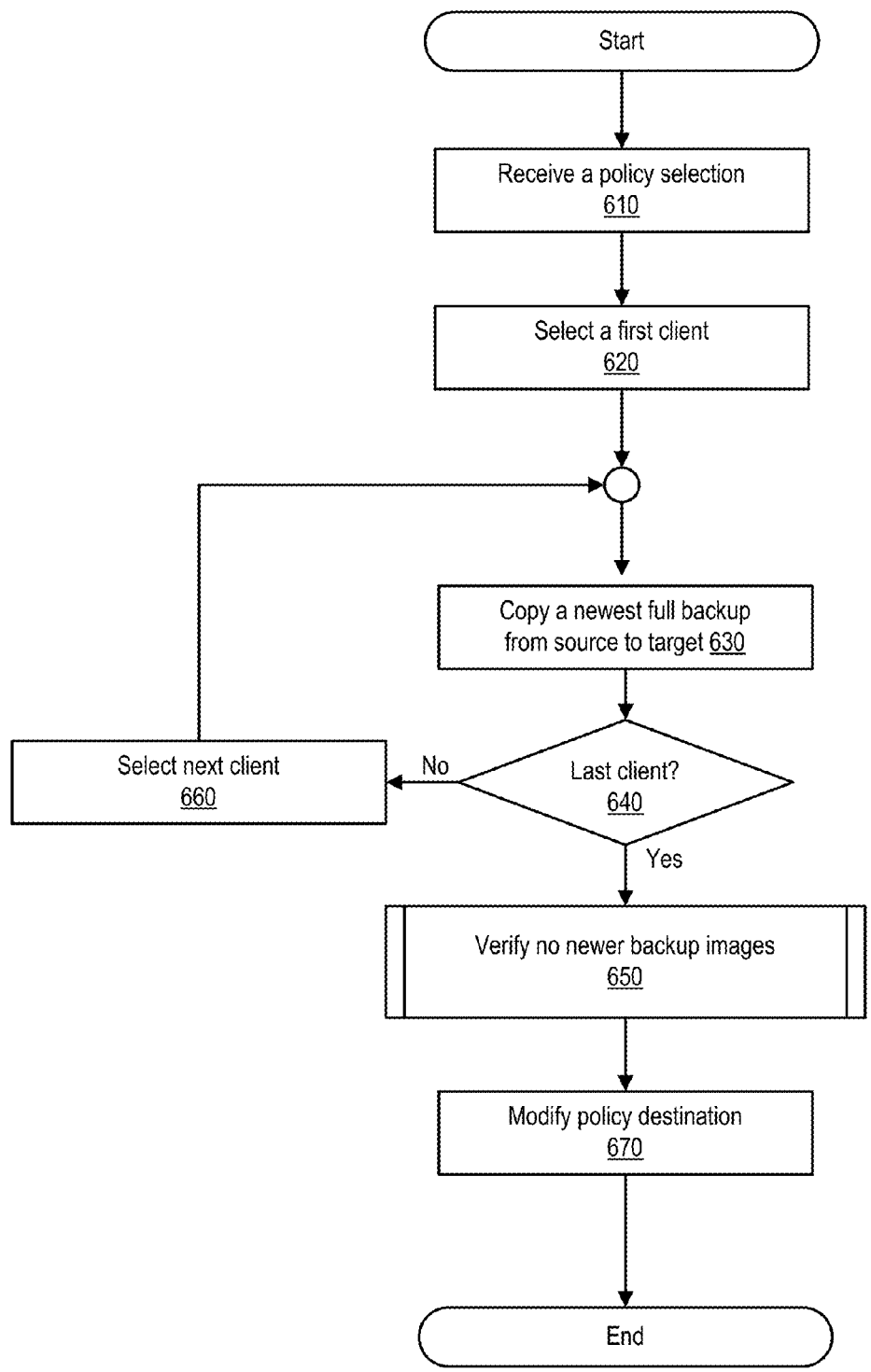
FIG. 6 is a flowchart of a method of seeding a target storage device, according to one embodiment of the present invention.

FIG. 6 is a flowchart of a method of seeding a target storage device. Generally speaking, the method seeds a target storage device by duplicating the most recently created full backup for each client (identified by a policy) to the target storage device. This is performed prior to programmatically switching the policy's target destination to the target storage device. This method can be performed by a duplication module, such as duplication module 134 of FIG. 1.

The method begins when the duplication module receives a policy selection at 610. This can involve a user selecting one or more policies that have backup images stored in a storage device. Selecting a policy can serve as an indication that the policy is to be migrated from a first storage device (known as a source storage device) such as storage device 160 of FIG. 1, to a second storage device (known as a target storage device) such as storage device 170 of FIG. 1. In an embodiment, the duplication module can automatically select a policy based on one or more criteria associated with the policy or with business rules relating to policy backup and retention. For example, a business can specify that all policies associated with a specified client are to be migrated. Another example is that all policies that are older than a specified age, or that relate to a specified type of data, such as a database, are to be migrated.

In response to a policy being selected, the duplication module can generate a list of clients identified by the selected policy. In an embodiment, this involves accessing metadata concerning backup images stored in the storage device, such as metadata 164 of FIG. 1. At 620, the duplication module selects a first client of the clients included in the policy. The duplication module can use one or more criteria as the basis of selecting the client. For example, the duplication module can select a client based on an age, priority, size, owner, type of client, and the like. In an embodiment, the duplication module can select a client based on position in the list and traverse the list of clients in order.

Once the duplication module selects a client, the duplication module locates the most recent full backup image of the client. In an embodiment, the storage device can include multiple backup images, including full backup images as well as incremental backup images, for a given client. The duplication module detects the type of backup image and when the backup image was created for each backup image associated with the selected client, e.g., by examining metadata associated with the backup images. Once the duplication module identifies the most recent full backup, the duplication module copies the most recent full backup image from the source to the target, at 630. The duplication module can copy the backup image in deduplicated form or can rehydrate the backup image and copy the rehydrated backup image from the storage device to the target storage device. In an embodiment, the duplication module modifies the metadata to indicate that the selected client's backup image has been duplicated to the target storage device and also indicates a time at which the duplication occurred.

The duplication module detects, at 640, whether the policy includes additional clients that have not been duplicated to the target storage device. In an embodiment, the duplication module detects whether the additional clients that have not been duplicated are listed on the list of clients associated with the policy. If so, the duplication module selects the next client at 660 and returns to 630, where the duplication module identifies and copies the most recent backup of the client from the source to the target.

Once the duplication module has copied the most recent full backup image of each client identified by the policy to the target storage device, the duplication module verifies, at 650, that no new backup images have been created for any of the clients identified by the policy. If the duplication module detects that a new backup image has been created for any of the clients while the duplication operation was ongoing, the particular policy/client combination is reseeded. That is, the new backup image is duplicated.

At 670, the duplication module modifies the policy to indicate that the target storage device is the destination for backup operations of the clients specified by the policy. Backup images created by subsequent backup operations of the clients identified by the policy are stored in the target storage device.

Figure 7:
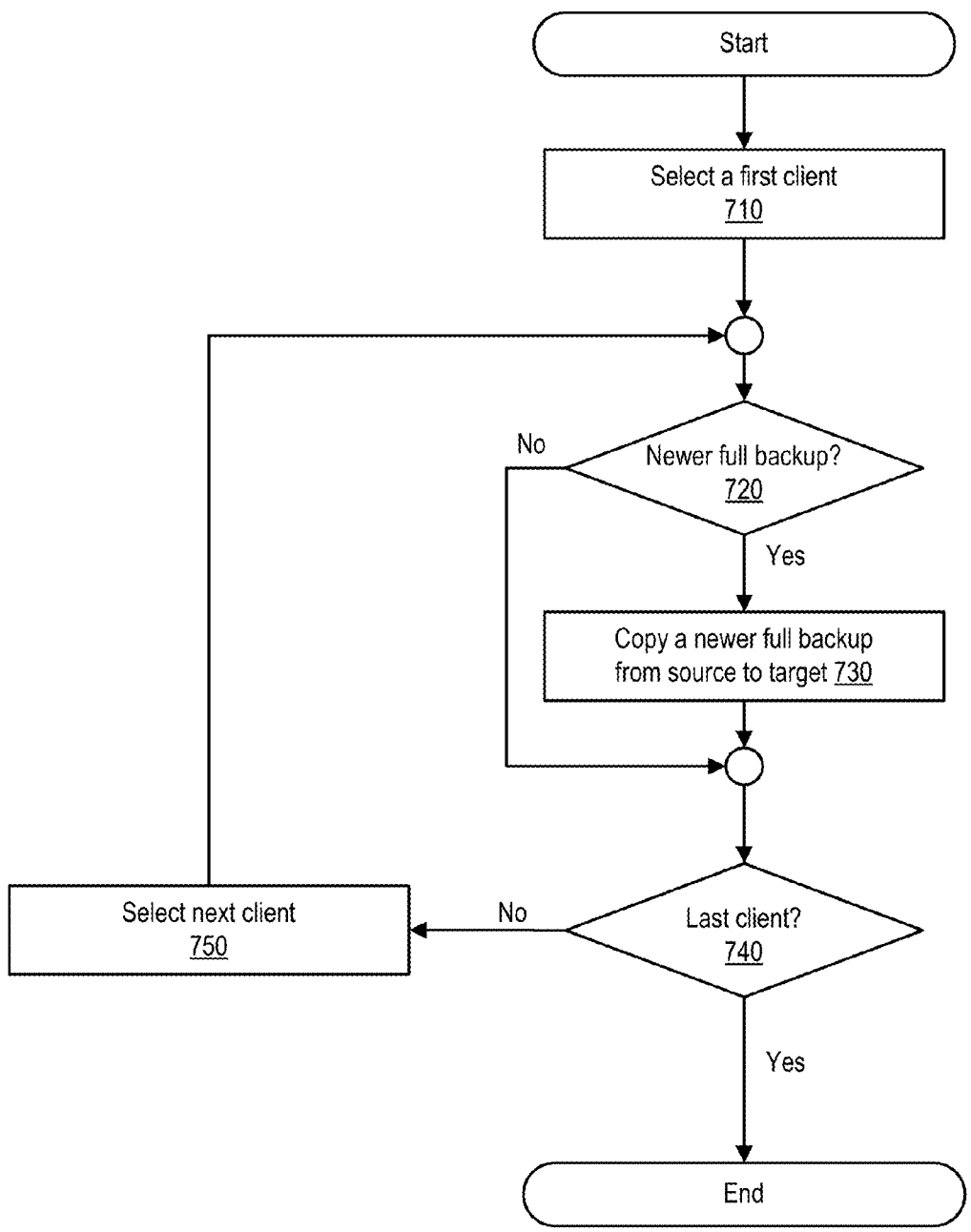
FIG. 7 is a flowchart showing additional details of a method of seeding a target storage device, according to one embodiment of the present invention.

FIG. 7 is a flowchart showing additional details of a method of seeding a target storage device. At 710, the duplication module selects a first client identified by the policy. The duplication module can use one or more criteria as the basis of determining an order in which clients are selected. For example, the duplication module can select a client based on an age, priority, size, owner, type of client, and the like. In an embodiment, the duplication module can select a client based on position in the list and traverse the list of clients in order. The duplication module can detect an order in which the duplication module previously accessed the clients and select the clients in the same order as was previously used.

At 720, the duplication module detects whether a full backup was created since the duplication module previously duplicated a full backup image associated with the selected client. For example, if a policy identifies ten clients, while the duplication module is duplicating the fifth client, subsequent to duplicating the first four clients, a new full backup image can be created, e.g., by backup module 132 of FIG. 1, of the first client. The opportunity for this increases depending on how long it takes to complete the duplication operation for the policy. For example, if a duplication operation fails to complete during a duplication window, the duplication operation can be resumed at a later time. Given that a significant amount of time may have elapsed between the first duplication window and the resumption of the duplication operation, the likelihood of the backup module creating a new backup image of one of the clients is increased.

If the duplication module detects that a newer full backup image has been created, the duplication module duplicates the newer full backup image from the source storage device to the target storage device. The duplication module can overwrite the previously duplicated full backup image, or can delete the previously duplicated full backup image.

At 740, the duplication module detects whether there are more clients identified by the policy for which the duplication module has not yet verified that no newer full backup images were created on the storage device subsequent to the duplication module duplicating a full backup image to the target storage device. If so, the duplication module selects, at 750, the next client and the method returns to 720.

Figure 8:
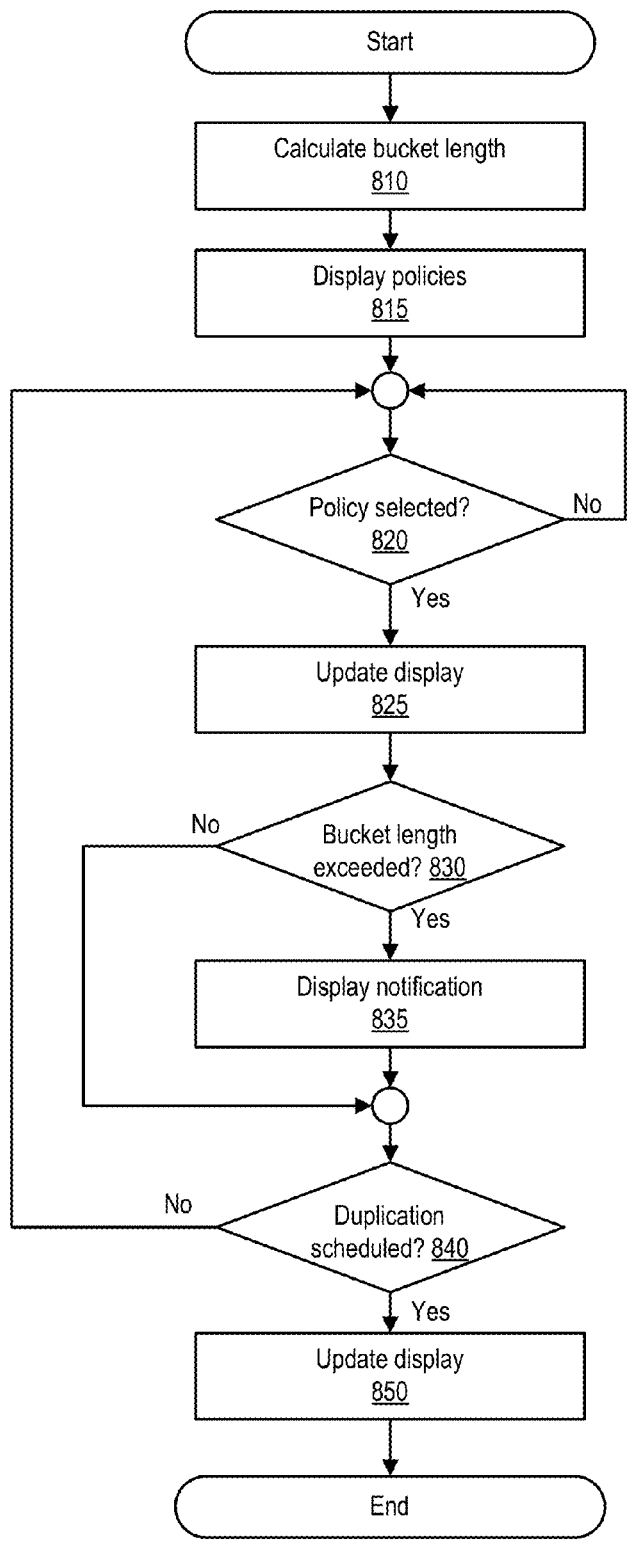
FIG. 8 is a flowchart of a method of generating a display for duplicating backup images, according to one embodiment of the present invention.

FIG. 8 is a flowchart of a method of generating a display for duplicating backup images. The method involves generating and displaying a user interface, e.g., on a computer monitor. The method can be performed by a display module, such as display module 140 of FIG. 1.

The method begins at 810, where the display module calculates a bucket length. The bucket length can be calculated as a function of a duplication window duration. The duplication window duration is a length of time allotted for the performance of a duplication operation. The display module can query a duplication module, such as duplication module 134, and request the duplication window duration. Alternatively, the duplication module can automatically transmit the duplication window duration to the display module. A user can specify the relationship between the duplication window duration and the bucket length. For example, the user can specify that the bucket length should be 25% larger than the duplication window duration. In response to detecting the duplication window duration, the display module calculates the bucket length. At 815, the display module displays information identifying one or more policies, such as the policy names. The display module can be configured to display an arbitrary number of policies. A user can also specify a source storage device. The display module can identify policies that have data, e.g., backup images, stored in the source storage device. For example, a user can specify that the display module should display one hundred policies. The display module can display the first one hundred policies that have data stored in the specified storage device. The display module displays enough policies that a cumulative estimate of the duration to duplicate the policies matches (either exactly or approximately) the bucket length. That is, if the duplication window duration is eight hours, and the bucket length is ten hours, the display module displays enough policies that the estimated time to duplicate all of the policies is ten hours. Displaying more policies than will fit in the duplication window duration gives users scheduling the duplication operations options in deciding which policies should be duplicated ahead of others.

At 820, the display module detects whether one or more of the policies is selected. For example, a user can select one or more of the policies. Selecting a policy indicates that the policy is to be included in a duplication operation. The display module updates, at 825, the display to indicate which policies have been selected. The display module can also update the display to indicate an estimated time to duplicate the selected policy, what clients are identified by the policy, the duplication status of the policy (e.g., scheduled or in progress), and the like. The display module can also update a visual representation of the bucket to reflect how much of the bucket would be consumed to duplicate the selected policies and how much of the bucket is still available.

In response to detecting that a policy is selected, the display module can access duplication information to determine an estimated time to duplicate the selected policy. In an embodiment, the duplication module generates an estimation of how long a policy will take to duplicate in response to the display module indicating to the duplication module that the policy has been selected for inclusion in a duplication operation.

The display module detects, at 830, whether the estimated time to duplicate the selected policies exceeds the bucket length. If so, the display module generates and displays a notification, at 835. The notification can indicate that the time to duplicate the selected policies exceeds a specified duration, e.g., the bucket length. In an embodiment the display module can generate and display a notification that the time to duplicate the selected policies would exceed the duplication window duration. The notification can include an error message, indicating that one or more policies will not be included in the duplication operation. In response to detecting that selecting a policy would cause the bucket to be exceeded, the display module can prevent selection of the policy. The display module can remove the policy from the display, or can otherwise indicate that the policy cannot be selected, e.g., by graying out the policy name. Alternatively, the display module can allow a user to select the policy.

If, after selecting the policy, the display module detects that the bucket has not been exceeded, the display module detects, at 840, whether a duplication operation is scheduled. In an embodiment, duplication operations can be scheduled to run in the background on a periodic basis. Alternatively, a user can specify a date and/or time to perform a duplication operation. If the display module detects that a duplication operation is scheduled, the display module updates, at 850, the display to indicate that the duplication operation is scheduled. Otherwise, the method returns to 820, where the display module waits for selection of additional policies.

Figure 9:
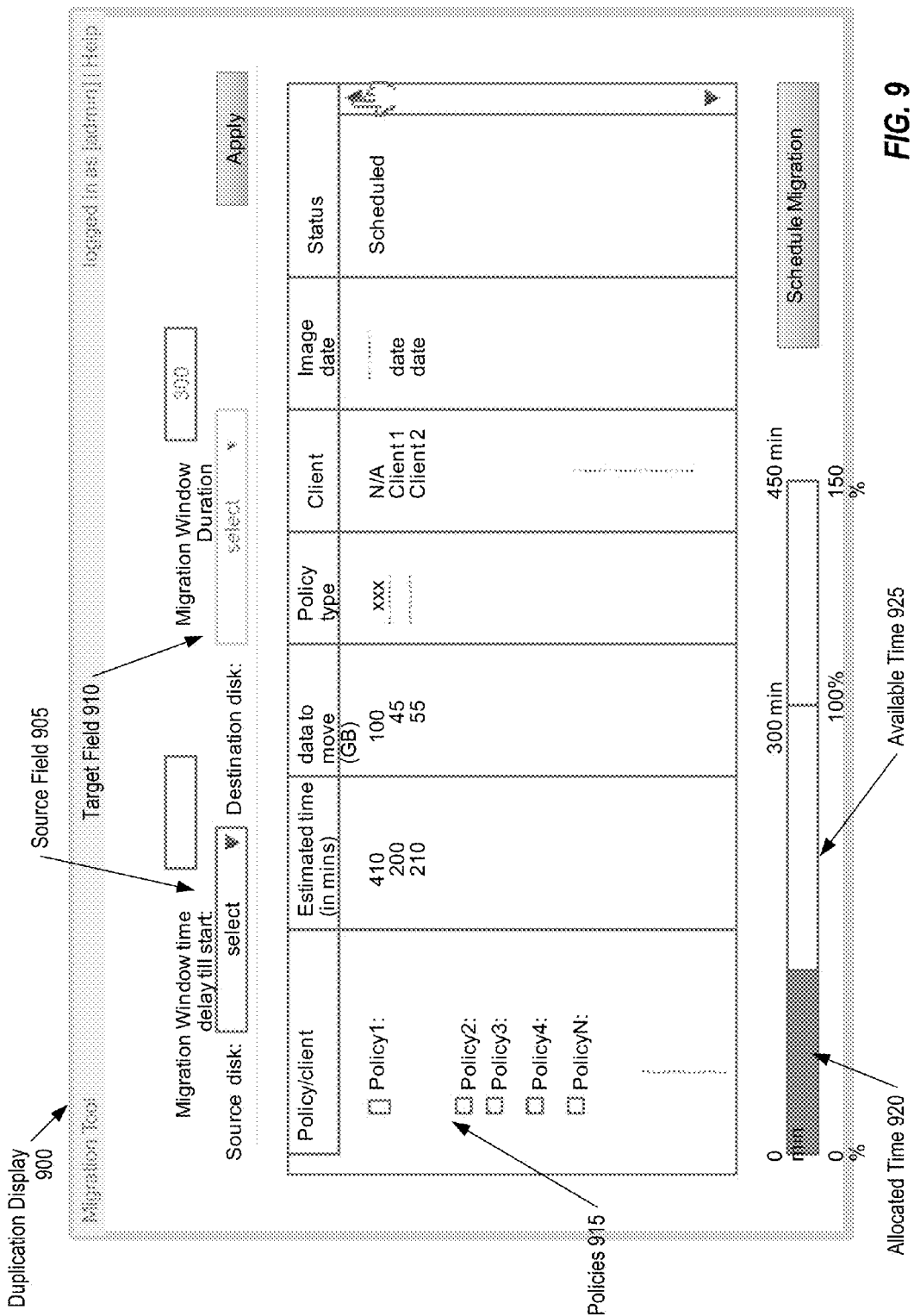
FIG. 9 is a block diagram illustrating an example of a user interface of a messaging system, in which a customer's dialogue with an agent is displayed, according to embodiments of the present invention.

FIG. 9 is a block diagram illustrating an example of a user interface of a system configured to perform duplication operations. The duplication display 900 is generated by a display module, such as display module 140 of FIG. 1, and can be used to configure and schedule duplication operations. In an embodiment, the user interface is presented to a user using a computer display, e.g., a monitor.

The duplication display includes a source field 905 and a target field 910. The source and target fields can be implemented by drop down menus that include all available source storage devices and target storage devices, respectively. In response to a user selecting a given source storage device, the duplication display generates and displays at policies 915, a list of policies stored in the source storage device.

The duplication display displays an estimated time to duplicate each policy and the size of the policies. The duplication display also displays a migration status for each policy, such as scheduled, unscheduled, in progress, complete, and the like.

The duplication display also displays an indication of a bucket. The bucket is a measure of time that the duplication module calculates as a function of a duplication window duration. The bucket includes an allocated time 920 and an available time 925. In response to a policy being selected, the display module modifies the display to reflect the selection. The estimated time to duplicate the selected policy is added to the allocated time, and the available time is reduced by the same amount. This graphical representation of the allocated and available time can be used to schedule duplication operations such that the duplication operations will complete within a user-specified time interval.

Figure 10:
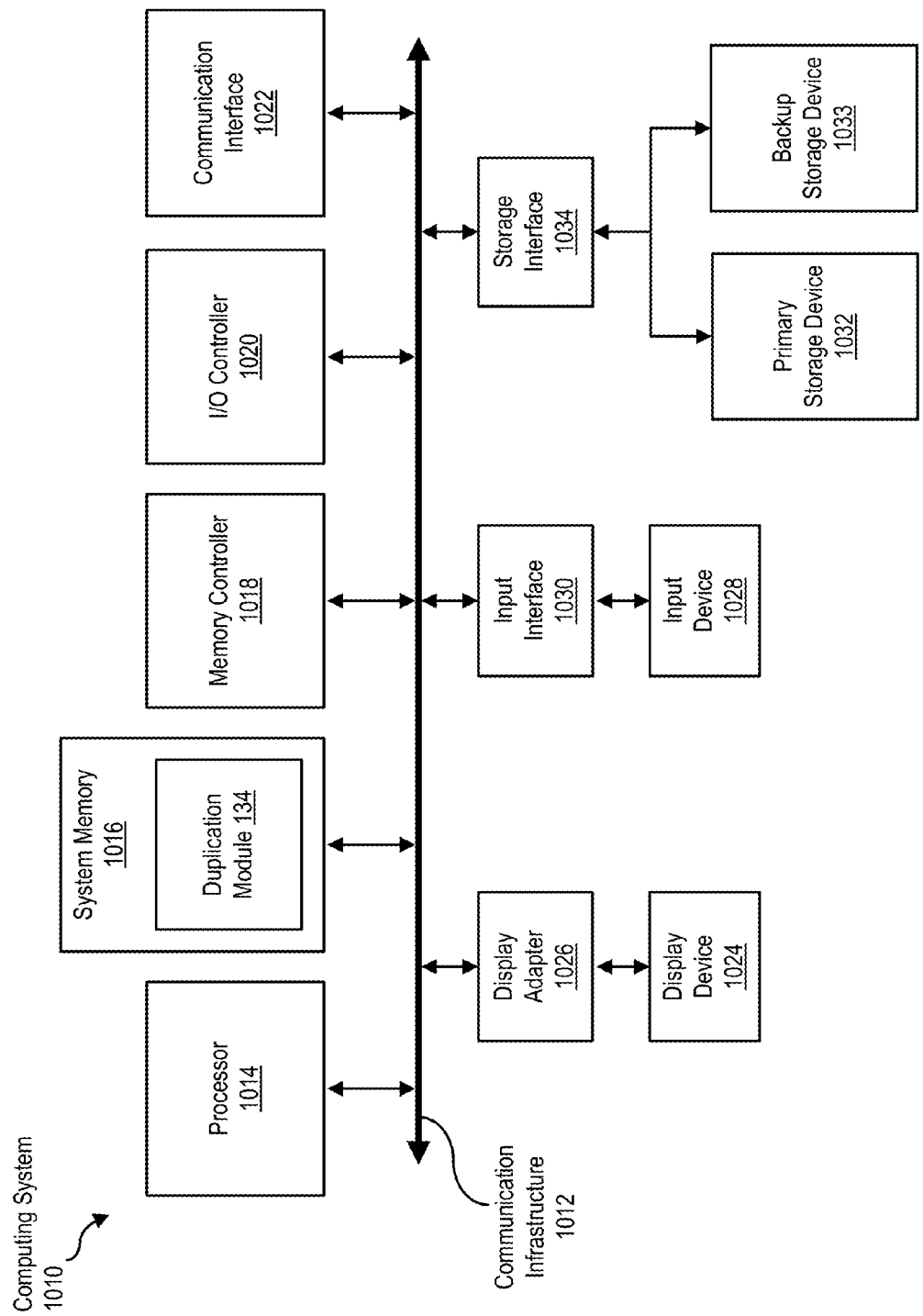
FIG. 10 is a block diagram of a computing device, illustrating how a duplication module can be implemented in software, according to one embodiment of the present invention.

FIG. 10 is a block diagram of a computing system 1010 capable of scheduling and performing duplication operations as described above. Computing system 1010 broadly represents any single or multi-processor computing device or system capable of executing computer-readable instructions. Examples of computing system 1010 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1010 may include at least one processor 1014 and a system memory

1016. By executing the software that implements a duplication module 134, computing system 1010 becomes a special purpose computing device that is configured to perform duplication operations in the manner described above.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the embodiments described and/or illustrated herein. For example, processor 1014 may perform and/or be a means for performing the operations described herein. Processor 1014 may also perform and/or be a means for performing any other operations, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 10102, as described in detail below). In one example, program instructions executable to implement a duplication module 134 (e.g., as shown in FIG. 1) may be loaded into system memory 1016.

In certain embodiments, computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the operations or features described and/or illustrated herein.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 10100, and storage interface 10104.

Communication interface 1022 broadly represents any type or form of communication device or adapter capable of facilitating communication between computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11094 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer) for display on display device 1024.

As illustrated in FIG. 10, computing system 1010 may also include at least one input device 1028 coupled to communication infrastructure 1012 via an input interface 10100. Input device 1028 generally represents any type or form of input device capable of providing input, either computer or human generated, to computing system 1010. Examples of input device 1028 include, without limitation, a keyboard, a pointing device, a speech recognition device, or any other input device.

As illustrated in FIG. 10, computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010. A storage device like primary storage device 1032 can store information such as deduplication signatures, backup images and/or a backup catalog.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10.

Computing system 1010 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1010 for storage in memory via a network such as the Internet or upon a carrier medium.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1010 may be configured as an application specific integrated circuit (ASIC) adapted to implement one or more of the embodiments disclosed herein.

Figure 11:
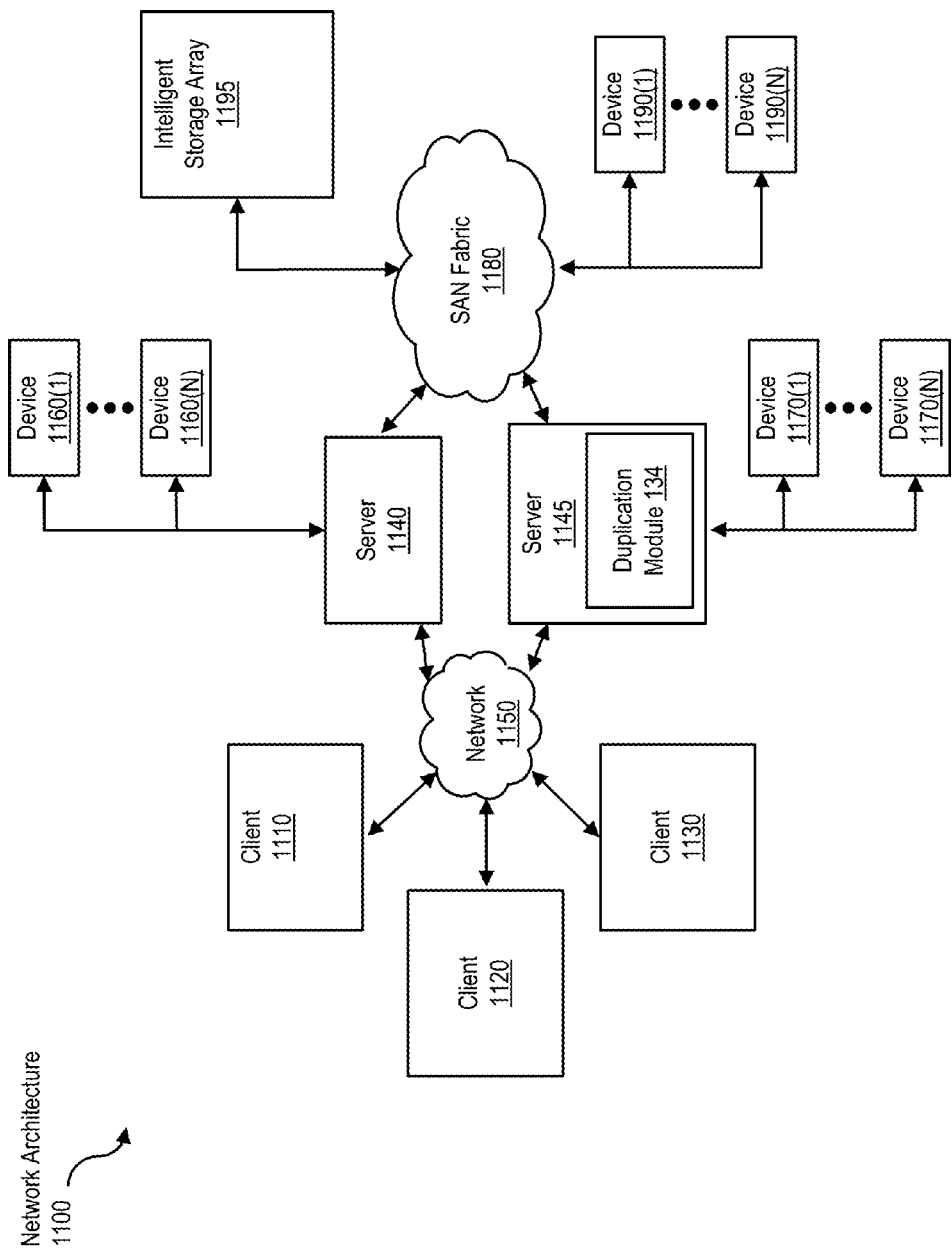
FIG. 11 is a block diagram of a networked system, illustrating how various computing devices can communicate via a network, according to one embodiment of the present invention.

FIG. 11 is a block diagram of a network architecture 1100 in which client systems 1110, 1120, and 1130 and servers 1140 and 1145 may be coupled to a network 1150. Client systems 1110, 1120, and 1130 generally represent any type or form of computing device or system, such as computing system 1010 in FIG. 10.

Similarly, servers 1140 and 1145 generally represent computing devices or systems, such as application servers or database servers, configured to provide various database services and/or run certain software applications. Network 1150 generally represents any telecommunication or computer network including, for example, an intranet, a wide area network (WAN), a local area network (LAN), a personal area network (PAN), or the Internet. In one example, one or more of client systems 1110, 1120, and/or 1130 may include a duplication module 134 as shown in FIG. 1.

As illustrated in FIG. 11, one or more storage devices 1140(1)-(N) may be directly attached to server 1140. Similarly, one or more storage devices 1170(1)-(N) may be directly attached to server 1145. Storage devices 1140(1)-(N) and storage devices 1170(1)-(N) generally represent any type or form of storage device or medium capable of storing data and/or other computer-readable instructions. In certain embodiments, storage devices 1140(1)-(N) and storage devices 1170(1)-(N) may represent network-attached storage (NAS) devices configured to communicate with servers 1140 and 1145 using various protocols, such as Network File System (NFS), Server Message Block (SMB), or Common Internet File System (CIFS). Such storage devices can store deduplication signatures, backup images and/or backup catalogs, as described above.

Servers 1140 and 1145 may also be connected to a storage area network (SAN) fabric 1180. SAN fabric 1180 generally represents any type or form of computer network or architecture capable of facilitating communication between multiple storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1140(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1140(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1140, server 1145, storage devices 1140(1)-(N), storage devices 1170(1)-(N), storage devices 1190(1)-(N), intelligent storage array 1195, or any combination thereof. All or a portion of one or more of the embodiments disclosed herein may also be encoded as a computer program, stored in server 1140, run by server 1145, and distributed to client systems 1110, 1120, and 1130 over network 1150.

In some examples, all or a portion of one of the systems in FIGS. 1, 10, and 11 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a duplication module may transform the behavior of a backup system such that backup image duplication operations can be scheduled to complete in a user-specified window.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    configuring a duplication operation, wherein the configuring comprises
        storing information identifying a duplication window,
        storing information identifying a source storage device, and
        storing information identifying a target storage device;
    detecting whether data can be copied in deduplicated form, wherein
        the detecting comprises comparing, between the source storage device and the target storage device at least one of a first segment size with a second segment size, a first type of chunk sizing with a second type of chunk sizing, or a first signature generation algorithm with a second signature generation algorithm;
    calculating a predicted duplication rate, wherein
        the predicted duplication rate comprises an estimated rate at which the data can be copied from the source storage device to the target storage device, and
        the data is copied during the duplication window;
    selecting a backup image to include in the duplication operation, wherein
        the duplication operation comprises a plurality of backup images, and
        the selecting is based on a size of the backup image, the predicted duplication rate, and the duplication window; and
    executing the duplication operation during the duplication window, wherein
        the executing comprises copying at least a portion of the data from the source storage device to the target storage device.

2. The method of claim 1, further comprising:
    measuring an actual duplication rate, wherein
        the actual duplication rate comprises a rate at which the data is copied from the source storage device to the target storage device.

3. The method of claim 2, wherein
    the calculating is based on the actual duplication rate.

4. The method of claim 2, further comprising:
    modifying the predicted duplication rate based on the actual duplication rate.

5. The method of claim 1, wherein
    the predicted duplication rate is based on a previous duplication rate, and
    the previous duplication rate comprises a rate at which second data was copied from the source storage device to the target storage device at a time prior to the calculating.

6. The method of claim 1, wherein
    the data comprises a deduplicated backup image.

7. The method of claim 1, further comprising:
    rehydrating the data in response to detecting that the data cannot be copied in deduplicated form.

8. The method of claim 1, wherein
    the predicted duplication rate is based on a deduplication density of the data.

9. A non-transitory computer readable storage medium storing program instructions executable to:
    configure a duplication operation, wherein configuring the duplication operation comprises
        storing information identifying a duplication window,
        storing information identifying a source storage device, and
        storing information identifying a target storage device;
    detect whether data can be copied in deduplicated form, wherein
        detecting whether data can be copied in deduplicated form comprises comparing, between the source storage device and the target storage device at least one of a first segment size with a second segment size, a first type of chunk sizing with a second type of chunk sizing, or a first signature generation algorithm with a second signature generation algorithm;
    calculate a predicted duplication rate, wherein
        the predicted duplication rate comprises an estimated rate at which the data can be copied from the source storage device to the target storage device, and
        the data is copied during the duplication window;
    select a backup image to include in the duplication operation, wherein
        the duplication operation comprises a plurality of backup images, and
        selecting the backup image is based on a size of the backup image, the predicted duplication rate, and the duplication window; and
    execute the duplication operation during the duplication window, wherein
        executing the duplication operation comprises copying at least a portion of the data from the source storage device to the target storage device.

10. The non-transitory computer readable storage medium of claim 9, wherein the instructions are further executable to:
    measure an actual duplication rate, wherein
        the actual duplication rate comprises a rate at which the data is copied from the source storage device to the target storage device, and
        calculating the predicted duplication rate is based on the actual duplication rate; and:
    modify the predicted duplication rate based on the actual duplication rate.

11. The non-transitory computer readable storage medium of claim 9, wherein
    the predicted duplication rate is based on a previous duplication rate, and
    the previous duplication rate comprises a rate at which second data was copied from the source storage device to the target storage device at a time prior to the calculating.

12. The non-transitory computer readable storage medium of claim 9, wherein the instructions are further executable to:
    rehydrate the data in response to detecting that the data cannot be copied in deduplicated form.

13. The non-transitory computer readable storage medium of claim 9, wherein the predicted duplication rate is based on a deduplication density of the data.

14. A system comprising:
one or more processors; and
a memory coupled to the one or more processors, wherein the memory stores program instructions executable by the one or more processors to:
configure a duplication operation, wherein configuring the duplication operation comprises
storing information identifying a duplication window,
storing information identifying a source storage device, and
storing information identifying a target storage device;
detect whether data can be copied in deduplicated form, wherein
detecting whether data can be copied in deduplicated form comprises comparing, between the source storage device and the target storage device at least one of a first segment size with a second segment size, a first type of chunk sizing with a second type of chunk sizing, or a first signature generation algorithm with a second signature generation algorithm;
calculate a predicted duplication rate, wherein
the predicted duplication rate comprises an estimated rate at which the data can be copied from the source storage device to the target storage device, and
the data is copied during the duplication window;
select a backup image to include in the duplication operation, wherein
the duplication operation comprises a plurality of backup images, and
selecting the backup image is based on a size of the backup image, the predicted duplication rate, and the duplication window; and
execute the duplication operation during the duplication window, wherein
executing the duplication operation comprises copying at least a portion of the data from the source storage device to the target storage device.

15. The system of claim 14, wherein the instructions are further executable to:
measure an actual duplication rate, wherein
the actual duplication rate comprises a rate at which the data is copied from the source storage device to the target storage device, and
calculating the predicted duplication rate is based on the actual duplication rate; and:
modify the predicted duplication rate based on the actual duplication rate.

16. The system of claim 14, wherein
the predicted duplication rate is based on a previous duplication rate, and
the previous duplication rate comprises a rate at which second data was copied from the source storage device to the target storage device at a time prior to the calculating.

17. The system of claim 14, wherein the instructions are further executable to:
rehydrate the data in response to detecting that the data cannot be copied in deduplicated form.

\* \* \* \* \*